United States Patent [19]

Maroschak

[11] 3,792,941
[45] Feb. 19, 1974

[54] MOLD BLOCKS FOR FORMING COUPLER COLLAR INTEGRAL WITH PIPE

[76] Inventor: Ernest J. Maroschak, Box 878, Roseboro, N.C. 28382

[22] Filed: Feb. 20, 1973

[21] Appl. No.: 333,996

Related U.S. Application Data

[63] Continuation-in-part of Ser. No. 271,225, July 13, 1972.

[52] U.S. Cl.......... 425/326, 264/151, 425/DIG. 206
[51] Int. Cl. ............................................. B29c 17/00
[58] Field of Search... 249/160, 161, 162, 164, 173, 249/163; 425/396, 392, 336, 369, 326 B, 326 BJ, 387 B, 388, 335, DIG. 206; 264/209, 210, 150, 151; 164/279, 276, 323, 324, 327, 328, 329, 330, 333, 384

[56] References Cited
UNITED STATES PATENTS

| | | | |
|---|---|---|---|
| 2,832,096 | 4/1958 | Kramer | 425/396 X |
| 3,028,290 | 4/1962 | Roberts | 425/396 X |
| 3,188,690 | 6/1965 | Zieg | 425/396 X |
| 3,286,305 | 11/1966 | Seckel | 425/326 |
| 3,310,620 | 3/1967 | Martelli | 264/151 X |
| 3,692,889 | 9/1972 | Hetrich | 425/396 X |
| 3,732,046 | 5/1973 | Martin | 425/392 X |

*Primary Examiner*—J. Spencer Overholser
*Assistant Examiner*—John S. Brown
*Attorney, Agent, or Firm*—Parrott, Bell, Seltzer, Park & Gibson

[57] ABSTRACT

A pair of cooperating mold blocks for forming an enlarged coupler collar on a corrugated plastic pipe being molded therein. The mold blocks have a mold surface including a corrugated portion defined by a series of alternating ribs and valleys and a non-corrugated portion defined by a relatively smooth semicylindrical wall having a diameter greater than the diameter of the valleys in the corrugated portion and adapted for forming the relatively enlarged coupler collar. The semicylindrical wall includes a plurality of arcuately spaced projections adapted for forming inwardly projecting latching members on the wall of the plastic pipe being molded thereagainst.

9 Claims, 5 Drawing Figures

PATENTED FEB 19 1974

3,792,941

── 3,792,941 ──

MOLD BLOCKS FOR FORMING COUPLER COLLAR INTEGRAL WITH PIPE

This application is a continuation-in-part of my copending application Ser. No. 271,225 filed July 13, 1972, and entitled METHOD AND APPARATUS FOR MAKING CORRUGATED PLASTIC PIPE WITH INTEGRAL COUPLER COLLARS.

It has previously been the practice to produce corrugated plastic pipes with corrugations over the entire length thereof and to interconnect adjoining pipes with separate sleeve-like coupler elements. In my aforementioned copending application a method and apparatus for producing an improved corrugated plastic pipe is disclosed wherein the pipe is provided with a coupler collar integrally formed at one end thereof to facilitate interconnection of adjoining lengths of the pipe.

It is an object of this invention to provide a pair of mold blocks adapted for forming a relatively enlarged coupler integral with a corrugated plastic pipe being molded therein.

It is a further and more specific object of this invention to provide a pair of cooperating mold blocks adapted for use in a continuous blow molding machine employing an endless series of forwardly moving cooperating pairs of mold blocks, wherein the pair of mold blocks has a corresponding pair of mold surfaces adapted for forming a relatively enlarged non-corrugated coupler collar integral with a corrugated plastic pipe.

Some of the objects of the invention having been stated, other objects will appear as the description proceeds when taken in connection with the accompanying drawings, in which FIG. 1 is a perspective view of an extruder and a blow molding machine adapted to use a pair of mold blocks according to the present invention;

Figure 1:
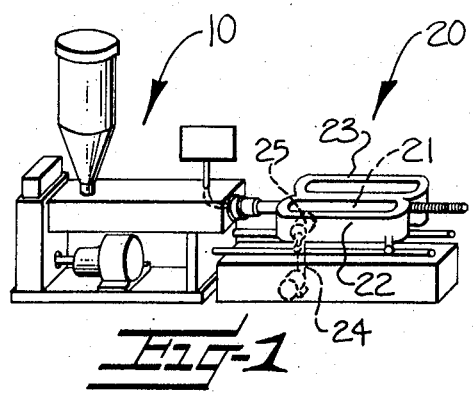

Referring now more particularly to the drawings and first to FIG. 1, there is shown a conventional apparatus for molding plastic pipe including an extruder 10 and a blow molding machine 20. The extruder is arranged to extrude a tube of softened thermoplastic material into an elongate blow molding zone 21 formed by a plurality of cooperating pairs of mold blocks arranged in end-to-end relation in two opposing endless series 22, 23. The mold blocks in each endless series move forwardly together along the substantially straight blow molding zone 21 in cooperating pairs with each cooperating pair of mold blocks forming a mold cavity and with the cavities of all the mold blocks in the blow molding zone together forming an elongate composite mold cavity of the desired internal configuration. Upon reaching the downstream end of the blow molding zone, the cooperating pairs of mold blocks separate and return upstream along their respective endless paths to the beginning of the blow molding zone. As is conventional, the extruder is provided with suitable pressure means 11 for introducing compressed air or other fluid into the tube being extruded to expand and mold the tube against the wall of the composite mold cavity in the blow molding zone.

Figure 2:
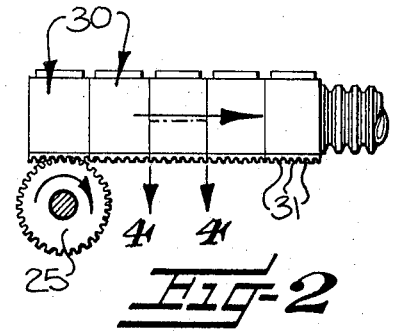
FIG. 2 is a schematic side view illustrating the drive means for moving the mold blocks of the present invention in a blow molding machine.
Figure 5:
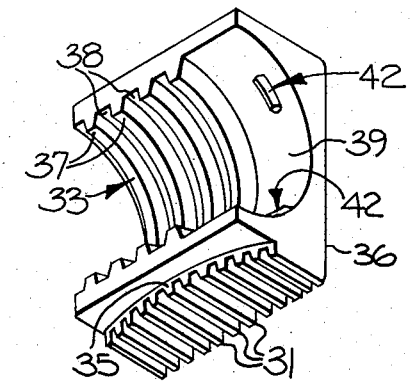
FIG. 5 is a perspective view of a mold block according to the present invention showing the underside thereof.

Blow molding machine 20 is provided with suitable drive means 24 for moving the mold blocks around their respective endless paths. As shown in FIG. 2, the drive means 24 preferably includes a toothed gear 25 driven by an electric motor or other suitable means, not shown, and which meshingly engages a corresponding toothed area on the underside of the mold blocks. As illustrated in FIG. 5, each mold block 30 preferably has a series of parallel gear teeth 31 similar to a rack gear formed on the underside of the mold block and extending along the axial dimension of the mold block. The gear teeth 31 on both of the mold blocks in the pair are preferably engaged simultaneously by toothed gear 25 so that the pair of cooperating mold blocks are moved simultaneously in the blow molding zone.

As is known, continuously corrugated plastic pipe may be produced on a blow molding machine of the type previously described by providing each mold block in the machine with a mold surface having a continuous series of corrugations thereon. As disclosed in my aforementioned copending application, an improved pipe having a relatively enlarged coupler collar integrally formed therewith may be molded in such a blow molding machine by providing most of the cooperating pairs of mold blocks in the blow molding machine with corrugations of annular ribs and valleys throughout the mold cavity while providing certain other cooperating pairs of mold blocks with a mold cavity in accordance with the present invention wherein the mold cavity includes a generally smooth relatively enlarged cylindrical portion and a corrugated portion with corrugations of alternating annular ribs and annular valleys.

Figure 3:
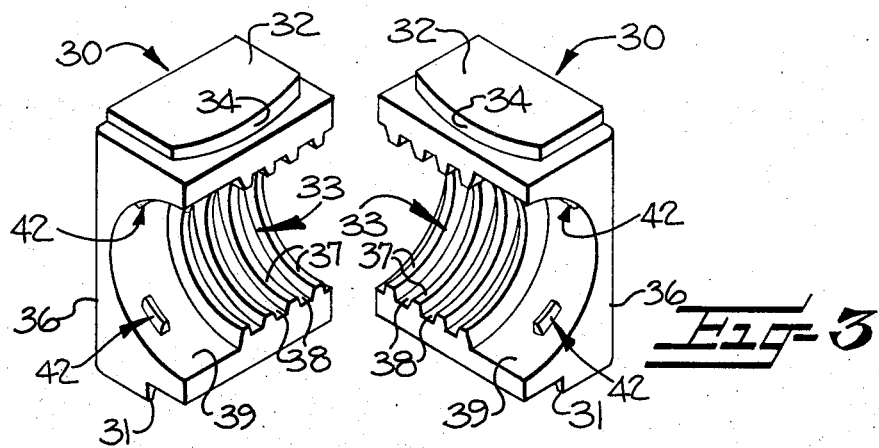
FIG. 3 is a perspective view of a pair of mold blocks according to the present invention.

FIG. 3 illustrates a pair of mold blocks 30 in accordance with the present invention. The mold blocks are preferably machined from steel stock and are subsequently hardened as is conventional. They are formed in cooperating pairs and include substantially planar exterior surfaces 32 and corresponding concave mold surfaces 33 which cooperate to define a generally cylindrical mold cavity extending through the center of the assembled pair of cooperating mold blocks, from one end thereof to the opposite end. As illustrated, the mold blocks have a length of about 4.17 inches along the axial dimension of the blocks and a height of about 5.5 inches. The width of a cooperating pair of the blocks is also about 5.5 inches. The upper and lower surfaces of the blocks are provided with rounded shoulder portions 34, 35 (FIGS. 3 and 5) which extend generally axially of the mold blocks and which aid the mold blocks in turning the relatively small radius at opposite reaches or ends of each respective endless series. To further facilitate turning the relatively small radius, the vertical edges 36 along the back side of each mold block are beveled or rounded slightly as shown in FIG. 3.

As seen from FIG. 3, the mold surface 33 of each of the mold blocks has a portion thereof including a series of semicircular transverse alternating ribs 37 and valleys 38 which form corrugations on the mold surface. These ribs and valleys have generally flat peripheral surfaces along the axial dimension of the mold surface. Stated otherwise, each of the ribs and valleys are of substantially uniform diameter. The remaining portion of the mold surface is defined by a relatively smooth semicylindrical wall 39 of a diameter substantially greater than the diameter of the valleys in the corrugated portion of the mold surface. When the corresponding concave mold surfaces of the pair of mold blocks are positioned together in assembled relationship, the transverse alternating ribs and valleys of each mold surface cooperate to define continuous uninterrupted annular corrugations in one portion of the mold cavity, while the relatively smooth semicylindrical walls cooperate to define a relatively smooth cylindrical portion of the mold cavity having a diameter greater than that in the corrugated portion. Preferably the valleys in the corrugated portion have a diameter of about 4½ inches while the relatively smooth-walled portion has a diameter of about 4⅝ inches. The ribs in the corrugated portion of the mold cavity have a diameter of about 4 inches.

Figure 4:
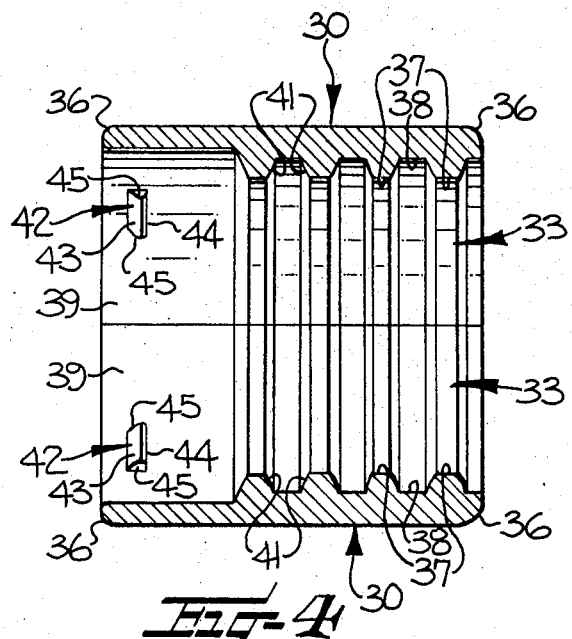
FIG. 4 is a cross sectional view of the mold surfaces of a pair of mold blocks looking in the direction of arrows 4—4 in FIG. 2

As illustrated in FIG. 4, the corrugated portion of the mold surface includes four ribs and three valleys with a half valley portion at one end of the mold block. The corrugated portion extends from one end of the mold block and over at least half the axial length thereof. The ribs and valleys on the mold surface are generally flat, as previously noted, with the valleys being somewhat wider than the ribs. The ribs include generally flat side wall portions 41 which are tapered or inclined at an acute angle to a plane normal to the axis of the mold cavity.

The relatively enlarged smooth-walled portion of the mold surface extends from adjacent the innermost rib on the mold surface to the end of the mold block opposite the corrugated portion. The axial length of this smooth-walled portion corresponds to at least twice the distance between corresponding points on adjacent valleys in the corrugated portion, so that when a coupler collar is molded in the smooth-walled portion, it will accommodate a length of pipe including at least two ribs of the size corresponding to the valleys in the corrugated portion of the mold block. As shown, this length corresponds to at least about 1.39 inches and preferably about 1.59 inches.

Positioned on the relatively smooth-walled portion of each mold surface are a series of relatively small arcuately spaced, radially inwardly directed projections 42 which are adapted for forming correspondingly shaped inward projections on the coupler collar being molded against the smooth-walled portion of the mold surface. The projections on the coupler collar serve as latch members for engaging and releasably retaining the end of a corrugated pipe in the coupler collar. As shown in FIGS. 3 and 4, the projections are spaced axially inwardly from the end of the mold block a substantially equal distance and are arcuately spaced apart around the inner circumference of the mold surface by substantially equal distances. Preferably, two projections are provided on each mold surface and are positioned 90° apart so as to cooperate in opposing pairs with the projections on the corresponding mold block of the pair. Although not illustrated, in some instances it may be desirable to provide an additional row of spaced projections inwardly of the aforementioned illustrated series of projections to provide additional engagement with the corrugations at the end of a corrugated pipe. The projections are provided on the mold surface preferably by means of separate inserts of the desired shape which are secured to the smooth-walled portion of the mold surface by an adhesive, cold solder, or other suitable means. The projections may however, if desired, be formed integral with the mold surface.

Preferably, and as illustrated in FIGS. 3 and 4, the projections 42 have a prisimoidal or wedge-like shape and include two major opposing surfaces 43, 44 with one surface 43 being angularly oriented and converging inwardly from the end of the mold block and with the second opposing surface 44 lying in a plane substantially perpendicular to the axis of the mold cavity. The wedge-shaped projections also include end walls 45 at opposite ends thereof. The wedge-shaped projections desirably have a length of about three-fourths inch and a height of about one-eighth inch, which height is less than the depth of the valleys in the corrugated portion of the mold blocks.

From the foregoing, it can be seen that a pair of cooperating mold blocks has been provided which is adapted for forming an enlarged non-corrugated coupler collar as an integral part of a corrugated plastic pipe. While the mold blocks of the present invention have been described with reference to a particular blow molding machine, it should be apparent that the mold blocks of the present invention may be used in association with molding apparatus other than the particular blow molding machine described herein.

In the drawing and specification, there has been set forth a preferred embodiment of the invention and although specific terms are employed, they are used in a generic and descriptive sense only and not for purposes of limitation.

That which is claimed is:

1. A pair of mold blocks adapted for forming an enlarged coupler collar on a corrugated plastic pipe being molded therein, said pair of mold blocks having corresponding concave mold surfaces which cooperate to define a generally cylindrical mold cavity extending from one end of the cooperating pair of mold blocks to the opposite end, each mold block having a series of semicircular transverse alternating ribs and valleys forming a corrugated portion on the concave mold surface and extending from one end of the mold block and over a predetermined axial length of the mold surface, the ribs and valleys of each of the mold blocks cooperating to form uninterrupted annular ribs and annular valleys in a portion of the mold cavity, a semicylindrical wall forming the remaining portion of the concave mold surface and extending from adjacent said corrugated portion to the opposite end of the mold block and having a diameter substantially greater than that of the valleys in the corrugated portion of the mold surface, the semicylindrical wall of each of the mold blocks cooperating to form a relatively enlarged generally cylindrical portion of the mold cavity, a plurality of arcuately spaced relatively short projections extending radially inwardly from said semicylindrical wall and spaced axially inwardly a short distance from said opposite end of the pair of cooperating mold blocks.

2. A pair of mold blocks according to claim 1 wherein said series of alternating ribs and valleys extends over at least half the axial length of said mold surface.

3. A pair of mold blocks according to claim 1 wherein the inner peripheries of the ribs and valleys are substantially flat in the axial direction and wherein the side walls of the ribs are substantially flat and form an acute angle with a plane normal to the axis of the mold cavity.

4. A pair of mold blocks according to claim 1 wherein said semicylindrical wall has an axial length of at least twice the distance between corresponding points on adjacent valleys in the corrugated portion of said mold surface.

5. A pair of mold blocks according to claim 1 wherein the valleys in the corrugated portion of said mold surface have a diameter of about 4½ inches and wherein the semicylindrical wall has a diameter of about 4⅝ inches.

6. A pair of mold blocks according to claim 1 wherein each mold block has an axial length of about 4.17 inches and wherein said semicylindrical wall has an axial length of at least about 1.39 inches.

7. A pair of mold blocks according to claim 1 wherein said projections are wedge-shaped and have one opposing surface thereof lying in a plane which is angularly oriented with respect to the axis of said mold cavity and converging inwardly from said opposite end of the mold blocks and have a second opposing surface lying in a common plane substantially perpendicular to the axis of said mold cavity.

8. A pair of mold blocks for use in a continuous blow molding machine employing two endless series of abutting forwardly moving cooperating pairs of mold blocks, said pair of mold blocks having corresponding concave mold surfaces which cooperate to define a generally cylindrical mold cavity extending from one end of the pair of mold blocks to the opposite end and being adapted for forming an enlarged coupler collar on a corrugated plastic pipe being molded therein, each mold block having a series of semicircular transverse alternating ribs and valleys forming a corrugated portion on the concave mold surface and extending from one end of the mold block and over at least about half the axial length of the mold surface, the ribs and valleys of each of the mold blocks cooperating to form uninterrupted annular ribs and annular valleys in a portion of the mold cavity, a semicylindrical wall forming the remaining portion of the concave mold surface and extending from adjacent said corrugated portion to the opposite end of the mold block and over an axial length of at least about twice the distance between corresponding points on adjacent valleys in the corrugated portion of the mold surface, said semicylindrical wall having a diameter substantially greater than that of the valleys in the corrugated portion of the mold surface, the semicylindrical wall of each of the mold blocks cooperating to form a relatively enlarged generally cylindrical portion of the mold cavity, a plurality of arcuately spaced projections positioned on the semicylindrical wall and extending radially inwardly therefrom, said projections being located on said semicylindrical wall so as to be arcuately spaced substantially equally apart around the interior of the cylindrical portion of the mold cavity and axially spaced substantially equally inwardly from said opposite end of the mold blocks, and gear means integral with an exterior surface of the mold block for engaging with drive means in a blow molding machine to move the pair of mold blocks simultaneously in the blow molding machine.

9. A pair of mold blocks according to claim 8 wherein said projections are defined by separate wedge-shaped segments secured to said semicylindrical wall and having one surface thereof lying in a plane which is angularly oriented with respect to the axis of said mold cavity and converging inwardly from said opposite end of the mold blocks and having a second surface thereof lying in a plane substantially perpendicular to the axis of said mold cavity.

* * * * *